United States Patent [19]

Martin

[11] Patent Number: 4,951,978
[45] Date of Patent: * Aug. 28, 1990

[54] HEAT-RECOVERABLE COMPOSITION COUPLING DEVICE

[75] Inventor: Charles L. Martin, Palo Alto, Calif.

[73] Assignee: Raychem Corporation, Menlo Park, Calif.

[*] Notice: The portion of the term of this patent subsequent to Jun. 19, 2001 has been disclaimed.

[21] Appl. No.: 376,375

[22] Filed: Aug. 1, 1989

Related U.S. Application Data

[60] Continuation of Ser. No. 878,525, Jun. 23, 1986, Pat. No. 4,874,193, which is a continuation of Ser. No. 552,711, Nov. 17, 1983, abandoned, which is a division of Ser. No. 29,212, Apr. 12, 1979, Pat. No. 4,455,041, which is a continuation of Ser. No. 608,206, Aug. 22, 1975, abandoned, which is a continuation-in-part of Ser. No. 404,723, Oct. 9, 1973, abandoned, and a continuation-in-part of Ser. No. 404,724, Oct. 9, 1973, abandoned.

[30] Foreign Application Priority Data

Apr. 9, 1975 [SE] Sweden ................................ 7504070

[51] Int. Cl.⁵ ............................................. F16L 17/02
[52] U.S. Cl. .................................. 285/369; 285/381; 285/382.7; 285/342
[58] Field of Search ................... 285/381, 382.2, 382.1, 285/382, 382.7, 369, 342, 417, 328, 422, 419, 376; 29/447, 521, 508, 529, 516; 403/273, 284, 278, 265, 281; 156/86; 264/230

[56] References Cited

U.S. PATENT DOCUMENTS

| | | | |
|---|---|---|---|
| 1,186,812 | 6/1912 | McFerron | 285/341 |
| 1,265,706 | 5/1918 | Bordeen | 29/447 X |
| 1,910,269 | 5/1933 | Sunderland | 403/284 |
| 2,378,525 | 6/1945 | Abegg | 29/447 X |
| 3,143,012 | 8/1964 | Deperthes | 29/447 X |
| 3,320,355 | 5/1967 | Booker | 285/381 |
| 3,513,429 | 5/1970 | Helsop | 285/381 |
| 3,675,949 | 7/1972 | Dawson | 285/382.2 |
| 3,786,552 | 1/1974 | Saito | 29/447 |
| 3,805,567 | 4/1974 | Sinerco | 285/381 |
| 3,819,149 | 6/1974 | Kindu | 265/381 |
| 3,913,444 | 10/1975 | Otte | 29/447 |
| 4,455,041 | 6/1984 | Martin | 285/369 |

FOREIGN PATENT DOCUMENTS

| | | | |
|---|---|---|---|
| 865082 | 1/1953 | Fed. Rep. of Germany | 285/421 |
| 825766 | 12/1959 | United Kingdom | 285/382 |
| 1327441 | 8/1969 | United Kingdom | |

Primary Examiner—Dave W. Arola
Attorney, Agent, or Firm—Denton L. Anderson; Sheldon & Mak

[57] ABSTRACT

Described herein are heat recoverable composite coupling comprising an outer, tubular heat-shrinkable sleeve and a hollow insert member adapted to receive plural substrates. The insert member has a tapered surface to allow it to accommodate substrates of different sizes. Recovery of the outer member forces the insert member into secure contact with the substrate forming a union between the substrates.

23 Claims, 3 Drawing Sheets

FIG_1a_
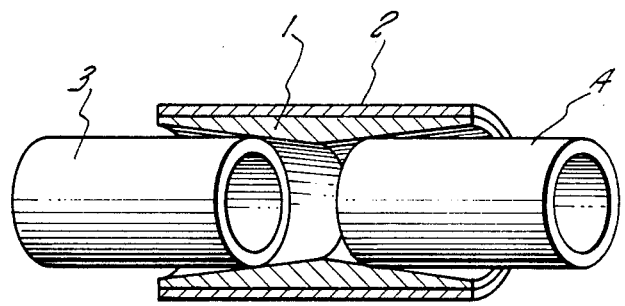
FIG_1b_
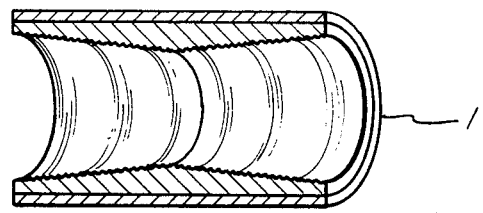
FIG_2
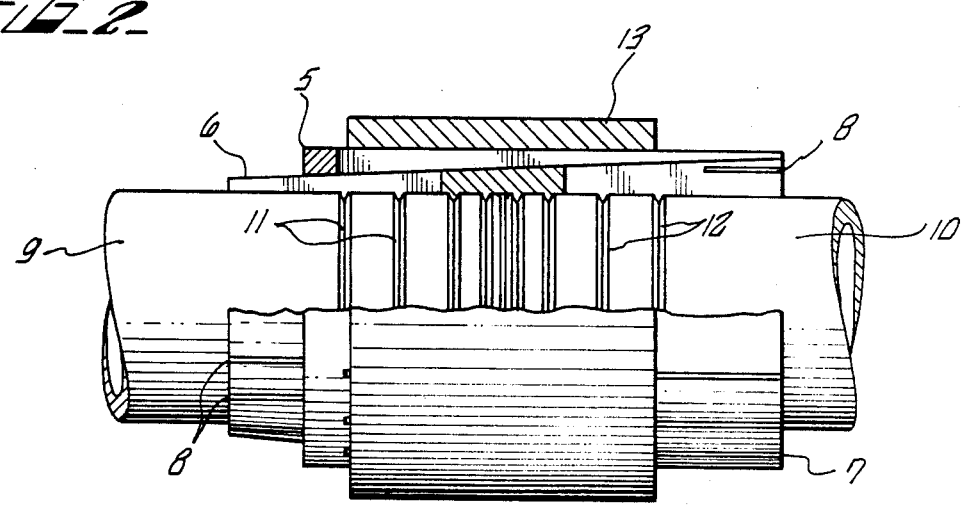

HEAT-RECOVERABLE COMPOSITION COUPLING DEVICE

RELATED APPLICATIONS

This is a continuation of pending application Ser. No. 878,525, filed on Jun. 23, 1986 now U.S. Pat. No. 4,874,193, which is a continuation of application Ser. No. 552,711, filed on Nov. 17, 1983 (now abandoned), which is a division of application Ser. No. 29,212, filed on Apr. 12, 1979 (now U.S. Pat. No. 4,455,041), which is a continuation of application Ser. No. 608,206, filed on Aug. 22, 1975 (now abandoned), which is a continuation-in-part of application Ser. No. 404,723, filed on Oct. 9, 1973 and a continuation-in-part of application Ser. No. 404,724, filed on Oct. 9, 1973 both now abandoned.

FIELD OF THE INVENTION

This invention relates to heat recoverable composite coupling devices.

BACKGROUND OF THE INVENTION

The composite coupling devices described and claimed in my aforementioned applications and my British Application 43684/74, the disclosure of which is also incorporated by reference, comprise a "driver", or heat-recoverable member, made from a memory metal and a second, sleeve member, usually an insert member, which is so constructed, and/or fabricated from such a material, that it enhances the coupling of the composite device to a substrate or substrates. Typically, the "driver" member and the "insert" member are both generally tubular and the insert member is provided with teeth and/or is made from a gall-prone material and/or is provided with portions, such as slots or grooves, of relative weakness, and/or is made from a material with desirable properties, e.g. electrical properties, having regard to the particular application of the composite coupling device.

As is explained in the above applications, "memory metals" are alloys which exhibit changes in strength and configurational characteristics on passing through a transition temperature, in most cases the transition temperature between the martensitic and austenitic states, and can be used to make heat-recoverable articles by deforming an article made from them whilst the metal is in its martensitic, low temperature, state. The article will retain its deformed configuration until it is warmed above the transition temperature to the austenitic state when it will recover towards its original configuration. The deformation used to place the material in the heat-unstable configuration is commonly referred to as thermally recoverable plastic deformation and can also, in certain cases, be imparted by introducing strains into the article above the transition temperature, whereupon the article assumes the deformed configuration on cooling through the transition temperature. It should be understood that the transition temperature may be a temperature range and that, as hysteresis usually occurs, the precise temperature at which transition occurs may depend on whether the temperature is rising or falling. Furthermore, the transition temperature is a function of other parameters, including the stress applied to the material, the temperature rising with increasing stress.

Amongst such memory metals there may especially be mentioned various alloys of titanium and nickel which are described, for example, in U.S. Pat. Nos. 3,174,851, 3,351,463, 3,753,700, 3,759,552, British Patents Nos. 1,327,441 and 1,327,442 and NASA Publication SP 5110, "55-Nitinol-The Alloy with a Memory, etc." (U.S. Government Printing Office, Washington, D.C. 1972), the disclosures of which are incorporated herein by reference. The property of heat recoverability has not, however, been solely confined to such titanium-nickel alloys. Thus, for example, various copper-based alloys have been demonstrated to exhibit this property in, e.g. N. Nakanishi et al, *Scripta Metallurgica* 5, 433–440 (Pergamon Press 1971) and such materials may be doped to lower their transition temperatures to cryogenic regimes by known techniques. Similarly, type 304 stainless steels have been shown to enjoy such characteristics, E. Enami et al, id at pp. 663–68. These disclosures are similarly incorporated herein by reference.

In general, the alloys are chosen to have transition temperatures between the boiling point of liquid nitrogen, $-196°$ C., and room temperature as the lowest temperature likely to be encountered in operation, i.e. between $-196°$ C. and $-75°$ C. in many aerospace applications. This enables the articles made from the alloys to be deformed to the configuration from which recovery is desired, and stored, in liquid nitrogen and yet insures that after heat recovery there is no danger of loss of mechanical strength during use by reason of the article encountering a temperature at which it reverts to the martensitic state.

However, storage of the deformed article in liquid nitrogen is inconvenient. Recently processes have been developed by which metallic compositions, particularly certain copper-based alloys, can have the transition temperature at which they revert to teh austenitic state transiently elevated from the normal temperature at which this occurs to a higher temperature, typically above room temperature. Subsequent recovery requires that the article be heated. Such alloys are referred to as being "preconditioned". Procedures by which they are preconditioned are described in U.S. applications by G. B. Broll: et al filed 19th Feb. 1975 entitled "Heat Treating Method", Ser. No. 550,847; "Mechanical Preconditioning Method", Ser. No. 550,555; and "Austenitic Aging of Metallic Compositions", Ser. No. 550,556, the disclosures of which are incorporated by reference.

As indicated above, by application of a preconditioning process to an alloy its transition temperature can be elevated. However, once recovery has been brought about by heating the article through its new transition temperature, the alloy's response to temperature change reverts to that it possessed prior to preconditioning. Accordingly, it remains austenitic until cooled to the temperature at which transition to martensite normally occurs, typically chosen to be at 0° C. or below depending upon the temperature environment likely to be encountered.

A typical application for the composition couplings described in the aforementioned Martin applications is to join tubular or cylindrical substrates. Properly dimensioned, these couplings can be employed to join substrate that vary greatly in size. For example, they might find application in joining tubing sections that could be used for hydraulic systems in aircraft. They can also be used to join sections of pipe of very large dimension.

In many situations the tolerance criteria for the cylindrical substrate to be joined are such that there can be significant variation in size between sections, for example on the order of 5% or even more, and the substrate may be significantly out of round. Also, it is frequently desired to connect substrates that vary somewhat in size. Accordingly, there is a need for composite couplings capable of accommodating such irregularities or variations in the substrate. The principal object of this invention is to provide such devices.

SUMMARY OF THE INVENTION

The present invention provides composite couplings capable of meeting this need. These couplings comprise a heat shrinkable driver of a memory metal such as described in the Background of the Invention, in combination with a generally cylindrical insert member that has a tapered surface, which may be either the interior or exterior surface, in order that it can cooperate with the substrate itself, yet another insert having an inverse taper, or the driver in order to accommodate differences in size between sections of cylindrical substrate or compensate for their being out of round. To improve the retention of the substrate within the coupling, an insert may be provided with serrations or teeth or be made from a gall-prone member so that the occurrence of galling between it and the substrate strengthen the joint.

In presently preferred embodiments of the invention, the insert itself comprises at least one concentrically disposed members. The outer member of the concentric pair is tapered on its inner surface and the inner member tapered on its outer surface with slopes that allow the surfaces to contact each other as one is moved relative to the other along their common longitudinal axis. By reason of this movement, the coaction of the tapered surfaces of the insert members can cause the inner member to be deformed in order to conform and more securely engage the insert to the substrate prior to recovery of the driver. In this way, less of the force exerted by the driver is expended initially deforming the insert to conform to the substrate and a more uniform force is exerted upon recovery of the driver.

In particularly preferred embodiments, a portion of the insert is threaded and provided with tightening nuts to facilitate the initial deformation of the insert prior to recovery of the driver.

DETAILED DESCRIPTION OF THE INVENTION

Various embodiments according to the present invention will now be described in more detail, by way of example only, with reference to the accompanying drawings, in which briefly described:

FIG. 1a and 1b illustrate a composite coupling for joining cylindrical substrates that differ in diameter;

FIG. 2 illustrates another form of composite coupling for joining cylindrical substrate;

Figure 3:
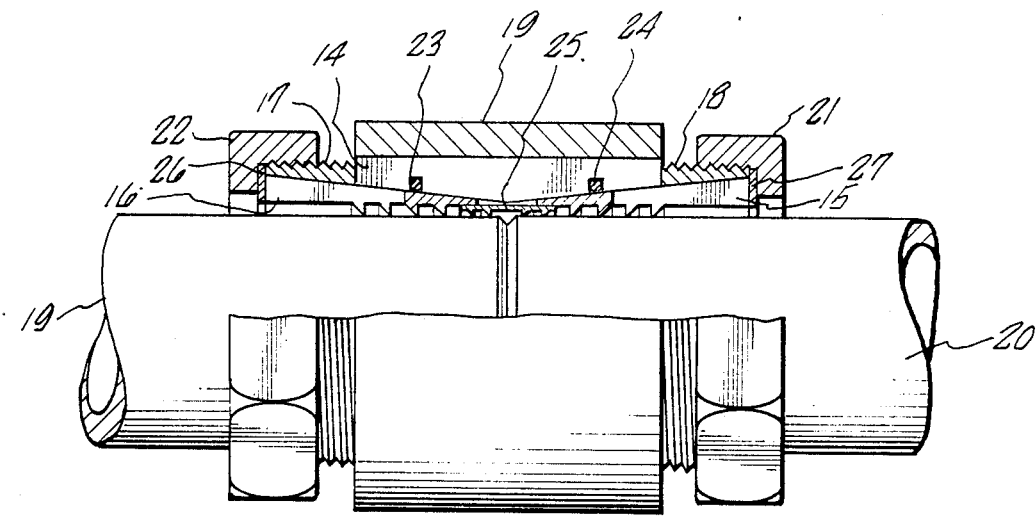
FIG. 3 illustrates a composite coupling for fluid tight connections.

Referring to the drawings:

FIGS. 1a and 1b illustrate the use of a composite device according to the present invention for joining tubular substrate. As shown in FIG. 1a, tapered insert 1 to heat recoverable driver 2 has a constant outside diameter but is tapered internally from a maximum internal diameter at its ends to a minimum internal diameter near its center. As a result of this internal taper, each end of insert 1 is capable of receiving tubular substrates 3 and 4 which may be of the same or different diameter. Also by reason of its taper, insert 2 is capable of accommodating a wider range of substrate diameters than would an insert of constant internal diameter.

As shown in FIG. 1b, insert member 1 may be provided with serrations or teeth to enable it to better grip the substrate when recovery has occurred. Insert member 2 may also be made of a gall-prone metal relative to the substrate.

Another device according to the present invention after its recovery is shown in FIG. 2 in which the insert comprises two members 5 and 6. The outer member 5 is tapered internally from a maximum internal diameter at one end to a minimum internal diameter at the other. As shown, member 5 is provided with longitudinal slots 7 at the end of maximum internal diameter to facilitate its deformation upon recovery. Inner member 6 is provided with an outer taper complementary to that of member 5 in that it tapers from a maximum outside diameter at one end to a minimum at the other. Member 6 is provided with terminal longitudinal slots 8 at either end to facilitate its deformation. As shown in FIG. 2, inner member 6 is provided with teeth to inhibit the withdrawal of tubular members 9 and 10 after recovery by forming circumferential dents 11 and 12.

Prior to recovery of driver 13, members 5 and 6 are wedged closely together, member 5 acting upon member 6 to compensate for variations in the substrate's outside diameter or substrate ovalness.

Another device according to the present invention that will accommodate cylindrical substrates having a large variation in outside diameter is shown in FIG. 3. As shown, the insert is comprised of three tapered parts, 14, 15 and 16. Outer member 14 is provided with threaded end portions 17 and 18 and tapers internally between the threaded portions to a minimum inside diameter at its center. As shown, member 14 is provided with longitudinal slots between its threaded sections to facilitate is deformation by the driver upon its recovery. Inner members 15 and 16 are lapered on their outside from a maximum outside diameter at one end to a minimum at the other and preferably are provided with terminal longitudinal slots as shown. As shown in FIG. 3, the inner members can be provided with teeth to engage the substrate, tubular sections 19 and 20.

Prior to recovery, the tubular substrates, which can have the same or different outside diameter are introduced into the aperture formed by members 15 and 16. Tightening nuts 21 and 22 provide means by which members 15 and 16 can be advanced into member 14 to initially engage substrate sections. It will be apparent that the furthest advance of members 15 and 16 is dictated by the diameter of the substrate sections. If the substrate is to carry fluid, O-ring type gaskets 23 and 24 can be provided for sealing purposes. To protect member 14 from a corrosive fluid, a toothed ring 25 can be inserted between members 15 and 16 to make the joint fluid tight. Of course ring 25 must be of a material resistant to the fluid. Between the tightening nuts and members 15 and 16 can be disposed washers 26 and 27. When ring 25 is employed, gaskets 23 and 24 may be omitted.

Figure 4:
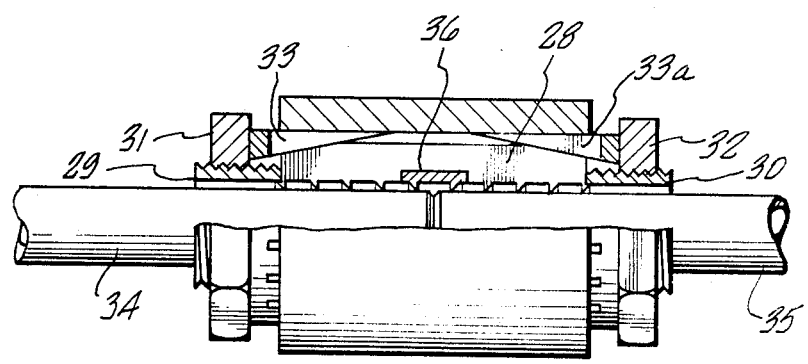
FIG. 4 illustrates yet another composite device for coupling cylindrical substrates.

In FIG. 4, there is shown a variant of the device of FIG. 3. As shown in FIG. 4, the insert again comprises 3 parts. However, the inner member 28 of the insert has threaded ends 29 and 30 to receive tightening nuts 31 and 32 which are employed to advance tapered outer members 33 and 34. By their advancement, insert members 33 and 33a force member 28 into close contact with substrate sections 34 and 35 prior to recovery of driver member 36. Preferably, the insert members are slotted to facilitate deformation.

In the devices of both FIGS. 3 and 4, the provision for oppositely tapered members provide means by which the inner member can be deformed prior to recovery of the driver to conform to the substrate. Thus when recovery is caused to occur, a larger portion of the recovery force can be asserted to further engage the insert and substrate rather than Being partially dissipated by having to first defrom the insert.

Figure 5:
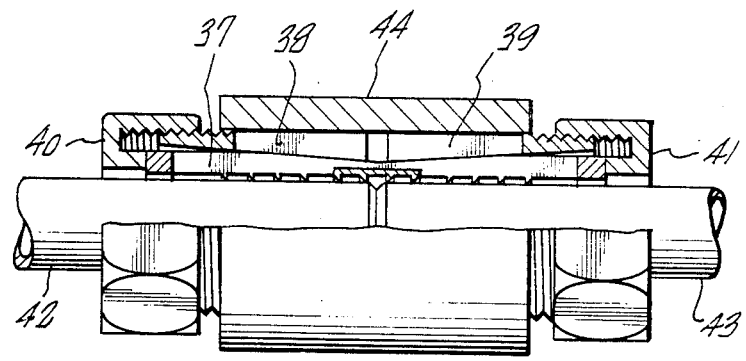
FIG. 5 illustrates a further form of coupling devices.

Another device according to the present invention is depicted in FIG. 5. In that device, the inner member 37 of the insert is tapered from a maximum outer diameter at its ends to a minimum diameter at its center. As shown, it is provided with teeth and has longitudinal slots. Outer members 38 and 39 are internally tapered to cooperate with member 37. Outer members 38 and 39 are threaded at their ends to receive tightening nuts 40 and 41. The action of these nuts is to withdraw elements 38 and 39 which has the effect of deforming inner member 37 to cause it to engage substrates 42 and 43. When this has been accomplished, recoverable driver 44 is warmed above its transition temperature to provide the final pressure required by the coupling.

Figure 6:
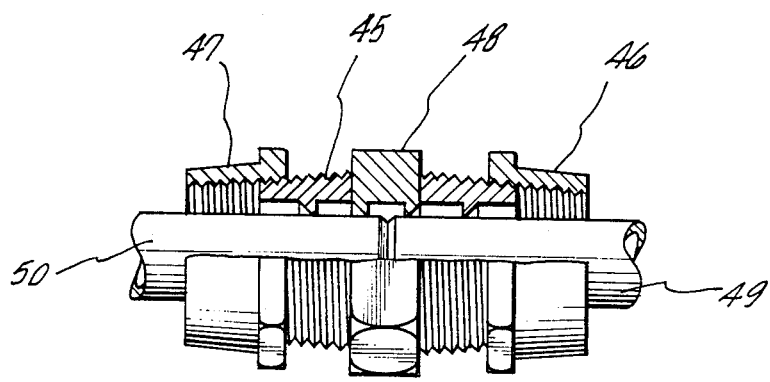
FIG. 6 illustrates another form of coupling device.

FIG. 6 illustrates another variant of the present invention in which the insert comprises a single member 45, preferably slotted, which is generally cylindrical and externally tapered from a mininum outside diameter at its ends to a maximum at its center. The insert is threaded from its ends to receive nuts 46, and 47 which also functions as heat recoverable drivers, i.e. they are capable of recovering to a smaller dimension. Center section 48 of insert 46 is provided with lugs to allow it to be held without rotation when the nuts are installed. Preferably insert 46 is provided with internal teeth as shown.

The nuts are rendered heat recoverable by mandrel expansion while the nut is at a temperature at which it exists in the martensitic state. The threads can be protected during expansion by providing the nut with a threaded liner of the same alloy that can be screwed into and out of the nut. The nut is preferably preconditioned after expansion to elevate the temperature at which it reverts to martensitic to insure that the transition does not prematurely occur during the installation of the coupling.

Once the substrates 49 and 50 have been inserted in the aperture defined by insert 45, the nuts are tightened to initially deform the insert and adapt its conformation to the irregularities of the substrates. The nuts are then heated to occassion their recovery and thereby tightly engage the insert and substrates.

The couplings previously described are but illustrative of the many forms the present invention may take. It will be apparent that the composite couplings of this invention are suited to many applications where the joining of cylindrical substrates is desired. For example, they might be employed to join solid or tubular structural members or cable. However, it is presently felt that the preferred application for these couplings is in the union of hollow member adapted to convey fluids, for example fluids in hydraulic systems or pipelines.

I claim:

1. A composite device for securely engaging at least one substrate which comprises:
   (a) at least one tubular, heat-recoverable, metallic compression sleeve; and
   (b) at least one tubular, metallic insert snugly and concentrically disposed within, adjacent to, and in contact with the compression sleeve so that when the compression sleeve is heated above its transition temperature, the insert is altered in at least one of its dimensions and is driven inwardly by the heat-recovered sleeve for securely engaging and forming a gas-tight seal with the substrate, the insert having an inner surface and an outer surface, the inner surface of said insert being tapered and the diameter of the outer surface being substantially constant.

2. A composite coupling device according to claim 1 wherein said insert is formed of a gall-prone metal.

3. A composite device according to claim 1 for coupling a pair of substrates together wherein the compression sleeve has a substantially constant inner diameter and the insert has a relatively uniform outside diameter and the inner surface of the insert tapers from a maximum near its ends to a minimum diameter about the mid-point of the insert.

4. A composite coupling device according to claim 3 wherein said insert is formed from a gall-prone metal.

5. A composite device according to claim 3 wherein said composite device further comprises a pair of hollow members adapted to be inserted into said insert from opposite ends of the insert, each member having an outer end, an inner end, an inner surface, a substantially constant inner diameter, and an outer surface that tapers from a maximum at the outer end of the member to a minimum diameter at the inner end of the member.

6. A composite device according to claim 5 wherein the inner surface of each member has a plurality of teeth thereon.

7. A composite coupling according to claim 5 wherein said members are made of a gall-prone metal.

8. A composite coupling device according to claim 5 wherein said device further comprises a ring adapted to be placed between said hollow members and over the interface of said substrates, said ring having a pair of teeth disposed on either side of said interface to facilitate the formation of a fluid gas-tight joint between said substrates upon recovery of said compression sleeve.

9. A composite device according to claim 5 further comprising urging means to urge said hollow members into close contact with said substrates and said insert prior to recovery of said compression sleeve.

10. A composite coupling device according to claim 9 wherein said urging means comprise threaded ends on said insert and a pair of tightening nuts adapted to be advanced on said threaded ends and thereby advance said hollow members towards each other.

11. A composite device according to claim 1 wherein the inner surface of said insert has a plurality of teeth thereon.

12. A composite device for securely engaging at least one substrate which comprises:
   (a) at least one tubular, heat-recoverable, metallic compression sleeve; and
   (b) at least one tubular, metallic insert snugly and concentrically disposed within, adjacent to, and in contact with the compression sleeve so that when the compression sleeve is heat-recovered by being heated above its transition temperature, the insert is altered in at least one of its dimensions and is driven inwardly by the heat-recovered sleeve for securely engaging and forming a gas-tight seal with the substrate, the insert having an interior surface and an exterior surface, at least one of the surfaces of the insert being tapered.

13. The device of claim 12 in which the interior surface of the insert is tapered.

14. The device of claim 13 in which the interior surface of the insert tapers from a maximum inner diameter at one end of the insert to a minimum inner diameter at its other end.

15. The device of claim 12 wherein the insert is provided with at least one continuous radial tooth circumferentially formed about the longitudinal axis of the insert.

16. The device of claim 15 in which such a tooth is on the interior surface of the insert and wherein upon heat recovery of the compression sleeve, the insert and the tooth directly contact and form a gas-tight seal with the substrate.

17. A method for forming a connection to at least one substrate comprising the steps of:
 (a) placing on the exterior of the substrate a composite device comprising (1) a tubular heat-recoverable metallic compression sleeve and (2) a tubular metallic insert snugly and concentrically disposed within, adjacent to, and in contact with the compression sleeve, the insert having an interior surface and an exterior surface, at least one of the surfaces of the insert being tapered; and
 (b) heat-recovering the compression sleeve by heating the compression sleeve to above its transition temperature for altering the insert in at least one of its dimensions and driving the insert inwardly for securely engaging and forming a gas-tight seal with the substrate.

18. The method of claim 17 wherein the insert is driven into direct engagement with the substrate.

19. The method of claim 17 wherein there is a member between the insert and the substrate.

20. A method for connecting a pair of substrates comprising the steps of:
 (a) placing on the exterior of the substrates a composite device comprising (1) a tubular-heat recoverable metallic compression sleeve and (2) a tubular metallic insert snugly and concentrically disposed within, adjacent to, and in contact with the compression sleeve, the insert having an interior surface and an exterior surface, at least one of the surfaces of the insert being tapered; and
 (b) heat-recovering the compression sleeve by heating the compression sleeve to above its transition temperature for altering the insert in at least one its dimensions and driving the insert inwardly for securely engaging and forming a gas-tight seal with both substrates.

21. The method of claim 20 wherein the insert is driven into direct engagement with the substrate.

22. An assembly comprising:
 (a) a pair of substrates;
 (b) a tubular, metallic compression sleeve that has been heat-recovered by being heated above its transition temperature; and
 (c) a tubular, metallic insert, the insert bieng snugly and concentrically disposed within, adjacent to, and in contact with the interior surface of the compression sleeve, and in contact with the exterior surface of both substrates, the insert having an interior surface and an exterior surface, at least one of the surfaces of the insert being tapered, wherein when the compression sleeve was heat-recovered by being heated above its transition temperature, the insert was altered in at least one of its dimensions and was driven inwardly by the heat-recovered sleeve for securely engaging and forming a gas-tight seal with both substrates.

23. The assembly of claim 22 wherein the insert is in contact with both substrates.

* * * * *